INVENTOR.
BY James W. Williamson
Alfred C. Body
ATTORNEY

United States Patent Office 2,748,338
Patented May 29, 1956

2,748,338

PHASE CONVERTER

James W. Williamson, Cleveland, Ohio

Application October 6, 1950, Serial No. 188,793

2 Claims. (Cl. 321—57)

The present invention pertains to the art of electrical power phase converters and, more particularly, to stationary transforming apparatus for converting multiphase electrical power to single-phase electrical power, or vice versa, with a balanced loading on the multiphase line.

The invention is particularly adaptable for supplying a single-phase load from a three-phase power line with the currents drawn from the three-phase system equal and separated in phase from each other by 120 electrical degrees as required for a balanced load on a three-phase system. The power factor may be lagging, unity or leading. The invention is also particularly adaptable to 60-cycle induction heating and the invention will be described with particular reference to such an application, although it will be appreciated that the invention can be used for converting two-phase power to single-phase power, single-phase power to two or three-phase power, on frequencies other than 60 cycles, or for different end uses as, for example, electric welding.

Induction heating normally requires a considerable amount of electrical power such as 200 kilowatts or more. Such large amounts of power are almost universally supplied over multiphase electrical power lines. An induction-heating load is ordinarily a single-phase load. It is usually objectionable from the standpoint of the power company to supply such a high-powered load on only one phase of the power circuit, particularly when this load is intermittent and, therefore, cannot be compensated for elsewhere in the system. In some installations, this objectionable feature can be partially overcome by supplying induction-heating coils in groups of three, one coil in each group being connected, usually through step-down transformers, across one phase of the power system. Where a single induction-heating coil would suffice, except for its unbalanced effect upon the power system to accomplish the required induction heating, the method of using a plurality of coils requires the use of three heating coils and probably three separate heating stations, thus increasing the over-all cost of the induction-heating installation. It is, therefore, desirable to draw a balanced three-phase load from the three-phase power circuits and, yet, to supply this three-phase power to a single induction-heating coil.

It is known that a system of power transformers electrically connected by what is generally called the "Scott" or T connection can convert three-phase power to two-phase power. In such a system, two separate transformers are required for the power conversion. Each of these transformers has the same number of turns on their secondaries. The primary of one of the transformers is connected across two of the power lines and is also center tapped. The primary of the other transformer has approximately $$\frac{\sqrt{3}}{2}$$

times the number of turns of the center tapped primary, and is connected between the center tap and the third power line. If it be assumer that the resistances and leakage reactances of the windings are negligible and that the exciting currents are also negligible, it can be shown that the line currents of each phase are equal in magnitude and 120 degrees out of phase if the two secondary currents are equal in magnitude, 90 degrees out of phase and in proper sequence. This condition may be realized by making the impedance of the loads on each secondary the same such as would be true if each secondary has to supply identical induction-heating coils heating identical loads.

So far as I am aware, it has been impossible heretofore, using stationary-converting equipment, to supply a single-phase, alternating-current load from a variable power-factor, three-phase, alternating-power source with a balanced load on each phase of the power source without employing ratio-changing transformers. These may be unduly complicated, cumbersome and expensive.

The present invention contemplates converting two-phase power such as might be obtained from a Scott or T connection to single-phase power by connecting the secondaries of the two transformers in series with a complex impedance $Z_L$ and providing additional complex impedances $Z_a$ and $Z_b$, each in shunt with one of the secondaries, all having the relationship $$\frac{1}{Z_a} - \frac{1}{Z_b} = \pm \frac{2j}{Z_L}$$

depending upon secondary polarities or phase rotation.

Alternatively, the invention contemplates converting single-phase power to two-phase power by making the impedance $Z_L$ a power source; in which case, the impedance $Z_L$ will then have a negative resistance component.

Further, alternatively, the invention contemplates arrangements as above described wherein one or more portions of the admittances $$\frac{1}{Z_a}, \frac{1}{Z_b} \text{ and } \frac{1}{Z_L}$$

are transferred to the primary or other parts of the secondary or additional windings, the transferences being made in such a way that the total vector power absorbed by each admittance (including the transferred portions thereof) remains the same and the phase angle of the voltage applied to each admittance and/or the transferred portions thereof remain the same.

As it is undesirable to have any appreciable losses in the impedance $Z_a$ and $Z_b$ when supplying power to the load impedance $Z_L$, the impedances $Z_a$ and $Z_b$ are, in accordance with the invention, preferably pure reactances $X_a$ and $X_b$ or as nearly pure reactances as is possible to obtain. Therefore, the impedance $Z_L$ must be real and, therefore, a resistance R; in which case, the invention contemplates a relationship of $$\frac{1}{X_b} - \frac{1}{X_a} = \pm \frac{2}{Z_L} = \pm \frac{2}{R}$$

again depending on secondary polarities and phase rotation. So long as this last equation is satisfied, the load on the three-phase system will be balanced.

This condition may be obtained by making either $X_b$ or $X_a$ infinite and, thus, dispensed with entirely. However, it is advantageous and the invention in its preferred embodiment for transforming three-phase power into single-phase power contemplates making $X_b$ an inductive or positive reactance and $X_a$ a capacitive or negative reactance.

The invention also contemplates an arrangement whereby a three-phase system at unity power factor may energize a single-phase load; in which case, $X_b$ will be equal to $-X_a$.

It is an object of the invention to provide a new and improved stationary power-conversion apparatus for converting three-phase power to single-phase power or vice versa.

Another object of the invention is the provision of apparatus for converting three-phase power to single-phase power or vice versa comprising a pair of transformers having secondaries with an equal number of turns, the primary of one being connected to a pair of the power lines and center tapped and the primary of the other being connected to the third power line and the center tap and having approximately $\frac{1}{2}\sqrt{3}$ times the number of turns of the center tapped primary, the secondaries being connected in series with a resistive load, one secondary having an inductive reactance $X_b$ in shunt therewith, the other secondary having a capacitive reactance $X_a$ in shunt therewith, all having values such that $$\frac{1}{X_b} - \frac{1}{X_a} = \frac{2}{Z_L} = \frac{1}{R}$$

The invention may be embodied in a number of different arrangements of parts, a preferred embodiment of which will be described in this specification and illustrated in the attached drawing wherein Figure 1 shows a schematic wiring diagram of an embodiment of the invention.

Referring now to the drawings wherein the embodiment shown is for the purpose of illustration only, like numbers will be used to indicate like parts and like numbers with a prime (') mark added will be used to indicate similar parts.

Figure 1:
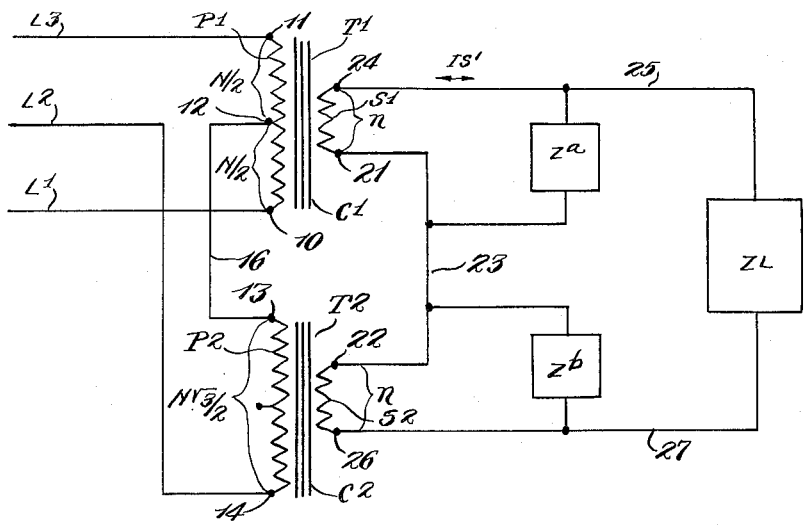

In Figure 1, a pair of transformers $T_1$, $T_2$ are shown connected to a conventional three-wire, three-phase power circuit $L_1$, $L_2$, $L_3$ and to a single-phase load $Z_L$. The transformer $T_1$ comprises a primary coil $P_1$, a secondary coil $S_1$ and a core $C_1$. The primary coil $P_1$ has outer terminals 10, 11 and a center tap terminal 12. The transformer $T_2$ has a primary $P_2$, a core $C_2$ and a secondary $S_2$ with the primary coil having outer terminals 13 and 14.

The primary coil $P_1$ has N number of turns and its terminals 10, 11 are connected to the lines $L_1$, $L_3$ respectively. The primary coil $P_2$ has $\frac{1}{2}\sqrt{3}$ N turns and its terminal 13 is connected to the center tap terminal 12 through wire 16. The terminal 14 is connected to the wire $L_2$. The secondaries $S_1$ and $S_2$ have terminals 21, 24 and 22, 26 respectively and also have the same number of turns $n$.

The primary circuit and arrangement just described is conventional in the Scott or T connection for converting three-phase power to two-phase power. In such a case, the secondaries $S_1$, $S_2$ would each be connected to their own individual single-phase load circuits. However, if they are to be connected to a single single-phase load circuit, such as a single induction-heating coil, the resulting loads on the lines $L_1$, $L_2$, $L_3$ would be considerably unbalanced. The present invention contemplates a circuit arrangement whereby the single-phase load $Z_L$ will draw a balanced or a true three-phase load on the lines $L_1$, $L_2$, $L_3$.

Thus, in the embodiment shown, the terminal 21 of secondary $S_1$ is connected to terminal 22 of secondary $S_2$ by means of wire 23. The other terminal 24 of the secondary $S_1$ is connected by wire 25 to the load impedance $Z_L$. The other terminal 26 of the secondary coil $S_2$ is connected to the terminal of the load impedance $Z_L$ by means of wire 27.

An impedance $Z_a$ is shown connected between the wires 25 and 23 and, thus, in shunt with the secondary $S_1$. A second impedance $Z_b$ is connected between the wires 27 and the wires 23 and, thus, in shunt with the secondary $S_2$. In the circuit shown, the secondary $S_1$ will have a current $I_{s_1}$ flowing therein and the secondary $S_2$ will have currents $I_{s_2}$ flowing therein. If these currents are equal in magnitude and 90 degrees out of phase and in proper sequence; i. e., a true two-phase load, the currents in the lines $L_1$, $L_2$, $L_3$ will all be of equal magnitude and 120 degrees out of phase. It can be shown that the condition of the currents $I_{s_1}$, $I_{s_2}$ being equal in magnitude and 90 degrees out of phase and in proper sequence can be obtained when $$\frac{1}{Z_a} - \frac{1}{Z_b} = \pm \frac{2j}{Z_L}$$

where $j$ equals $\sqrt{-1}$.

Whether the plus or the minus sign applies depends in any given case upon the relative polarities and the phase rotation of the three-phase system. In the embodiment of my invention shown in Figures 1, 2 and 3, it may be assumed that:

(1) Points $L_1$, $L_2$, $L_3$ reach their maximum potentials in that order.

(2) Considering either transformer, the directions of the primary and secondary windings are such that when the upper terminal of the primary winding is at maximum potential, the upper terminal of the secondary is at maximum potential; and when the lower terminal of the primary is at maximum potential, the lower terminal of the secondary is at maximum potential.

Figure 2:
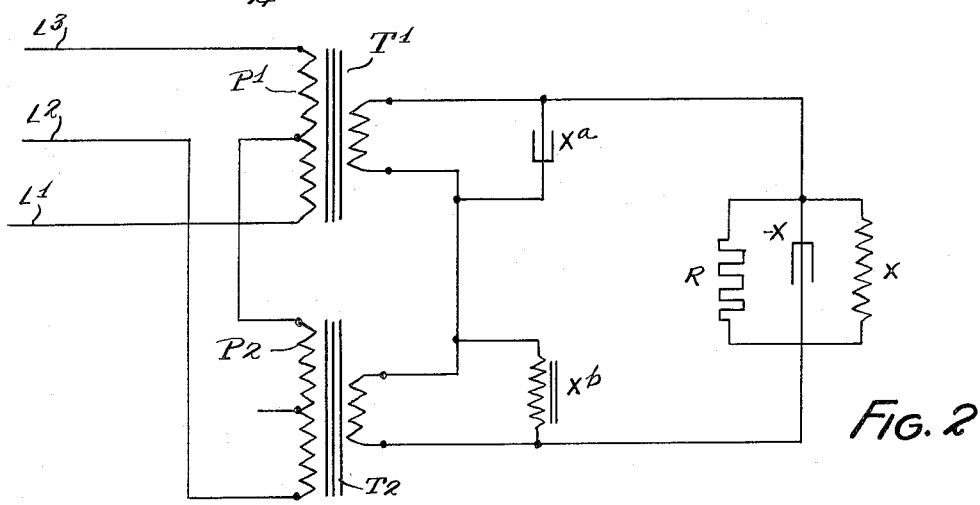
Figure 2 is a view similar to Figure 1 showing an embodiment of the invention as applied to the art of induction heating.
Figure 3:
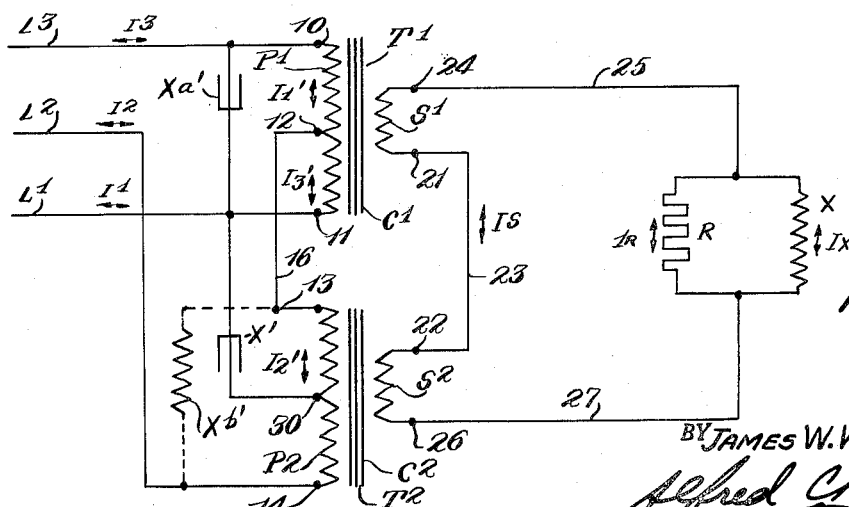
Figure 3 is a view similar to Figure 2 showing an alternative arrangement with the capacitors connected in the primary circuit of the transformers.

With these conditions, where reference is made to Figure 1, 2 or 3, the plus sign applies in all equations where a plus-or-minus sign is given. If the phase rotation were reversed so that $L_2$, $L_1$, $L_3$ reached maximum potentials in that order, the minus sign would apply in all equations where a plus or minus sign was given.

It may thus be seen that it is possible to convert three-phase power to single phase so that a single-phase load will draw currents of equal magnitude in three wires of a three-phase system and in the proper electrical relationship.

For the purpose of supplying the load impedance $Z_L$ with power, it is undesirable to have any appreciable losses in the impedance $Z_a$ and $Z_b$. Therefore, $Z_a$ and $Z_b$ should be reactances or as nearly pure reactances as it is possible to obtain. In such a case, the above equation can only be satisfied when and if the load impedance $Z_L$ is real and, therefore, a resistance. With this in mind, the above equation may be retained by substituting $jX_a$, $jX_b$ for $Z_a$ and $Z_b$ and R for $Z_L$; in which case, the following relationship holds true:

$$\frac{1}{X_b} - \frac{1}{X_a} = \pm \frac{2}{Z_L} = \pm \frac{2}{R}$$

A circuit satisfying the relationship of this formula is shown in Figure 2 of the drawings. So long as this last equation is satisfied, the load on a three-phase system will be balanced. This condition can be satisfied by making either $X_b$ or $X_a$ infinite and, thus, dispensed with entirely. However, it is preferred to make $X_b$ an inductive or positive finite reactance and $X_a$ a capacitive or negative finite reactance. Such an arrangement is shown in Figure 2. The condition for unity power factor is for $X_b$ to be equal to $-X_a$.

In Figure 2, the loaded induction-heating coil is shown as broken down into its equivalent electrical components; namely, the resistance R in parallel with the inductive reactance X. A capacitive reactance $-X$ is provided in shunt with the heating coil and its load, so that the impedance of the entire combination as presented to the power source will be the pure resistance R.

In most induction-heating applications, the voltages applied to the heating coil or load $Z_L$ will be relatively low and the number of microfarads of capacity required for the reactances $X_a$ and $-X$ will be relatively large. It has been found possible to transfer these capacitive reactances to the primary circuit where the voltages are higher and the number of microfarads required will be much smaller in order to accomplish the desired result of a balanced and usually unity power factor load on the three-phase system. Also, the impedance $X_b$ can be transferred to the primary.

Such a circuit arrangement is shown in Figure 3 wherein a capacitor $X_a'$ is connected across the wires $L_1$, $L_3$. This capacitor is in place of the capacitor $X_a$ and may have a value equal to $(N/n)^2 X_a$. In a like manner, a capacitor $-X'$ is connected between the line $L_3$ and tap 30 which is spaced $n/2$ turns on the primary $P_2$, from terminal 13, this capacitor having the value of $-(N/2n)^2 X$. In a like manner, the impedance $X_b$ may be transferred to the primary side for the transformer $T_2$ and connected directly from the wires 16 to $L_2$. This reactance, when transferred, will have the value $\frac{3}{4}(N/n)^2 X_b$. In practice, however, the impedance $X_b'$ may be omitted and the effect of this impedance can be obtained by increasing the exciting current of the transformer $T_2$ by providing an air gap of the proper amount in the core $C_2$ of the transformer.

In connecting the impedances as shown in Figure 3, it will be realized that the impedances $$\frac{1}{Z_a}, \frac{1}{Z_b} \text{ and } \frac{1}{Z_L}$$

have merely been transferred to other parts of the transformer, such as the primary, or other parts of the secondary and that the transferences have been made in such a way that the total vector power or complex volt amperes absorbed by each admittance (including the transfererd portions thereof) remains the same and the phase angle of the voltage applied to each admittance and/or the transferred portions thereof remains the same. Transferring the impedance is generally desirable where the invention is being employed to supply power at low voltages and high currents; in which case, if the reactances were to be employed on the secondary of the transformers, rather impracticably large sizes would have to be employed. By transferring the impedances to other parts of the transformer where the voltages are higher, more practicable sizes may be employed. It will be appreciated, however, that the reactive amperes will flow in the transformer. This is generally not detrimental.

In Figure 3, the line currents in the lines $L_1$, $L_2$, $L_3$ will be respectively $I_1$, $I_2$, $I_3$. These currents will not be the same as the currents in the primary windings. Thus, the upper half of the primary $P_1$ will have a current $I_3'$ flowing therein. The lower half of the primary $P_1$ will have a current $I_1'$ flowing therein. The upper half of the primary $P_2$ will have a current $I_2'$ flowing therein. For maximum efficiency and power output with a given loss, it is preferred that the areas taken up by the various windings on their respective cores should be so proportioned so that the respective current densities in the wires will be approximately the same for all windings.

For a balanced unity power factor load on a three-phase system under the assumptions which have been stated, where $\theta$ is the power factor angle (positive when lagging) of the loaded induction-heating coil, the relationship between the various currents involved are as follows:

A preferred embodiment of the invention has been described in accordance with the requirements of the patent statutes. It will be obvious that modifications of the preferred embodiment will occur to others upon a reading and understanding of this specification. For example, the relative phasing of the power input of the transformers $T_1$ and $T_2$ may be changed by altering the line connections; such as, for example, changing the connections of the lines $L_2$ and $L_3$. In such an event, to satisfy the conditions of the invention, it would be necessary to switch the nature of the reactances $X_a$ and $X_b$ from capacitive and inductive respectively to inductive and capacitive respectively. Also, as stated, these reactances may be shifted to the primary side of the transformer as above explained.

Further, the resistance R may be either positive or negative. A negative resistance may be realized physically by a single-phase generator operating at unity power factor. If E is the output voltage of this generator and $I_R$ the current which it supplied R, as given by the above formulae, equals $-E/I_R$. With reference to the equation which is stated as necessary to satisfy the conditions of the invention, it will be realized that if R is negative, $X_b$ might be made a capacitive or negative reactance and $X_a$ might be made a inductive or positive reactance. If the single-phase generator referred to is operated at a power factor other than unity, it may be represented symbolically by a generator operating at unity power factor in parallel with an inductive or capacitive reactance, which reactance can, of course, be shifted to the primary sides of the transformer if desired. It will, therefore, be obvious that the invention provides a means of supplying a balanced three-phase load from a generator operating at any desired power factor. Other modifications will occur and it is my intention to include all of such modifications insofar as they come within the scope of the appended claims.

Having thus described my invention, I claim:

1. In apparatus of the type described, a pair of transformers each having first windings with $n$ number of turns, said windings being connected in series with a single-phase electrical system which can be represented by a resistance R in parallel with a finite reactance X, one of said transformers having a center tapped second winding having N number of turns, said winding being connected across two lines of a three-phase electric system, the other transformer having a second winding with $\frac{1}{2}N\sqrt{3}$ number of turns, said last mentioned winding being connected across the third line of the three-phase system and the center tap of the first mentioned second winding, a reactance $X_a$ electrically coupled with one of said first windings so as to be effectively in shunt therewith and a reactance $X_b$ electrically coupled with said other first winding so as to be effectively in shunt therewith, said reactances having values when transferred to said first windings in relation to the square of the ratio of the voltages across the reactance and the respective first winding to satisfy the relationship $$\frac{1}{X_b} - \frac{1}{X_a} = \frac{2}{R}$$

and a reactance $X'$ connected across terminals of said transformers having a voltage $e_x'$ thereacross of the same phase as the voltage $e_x$ across said single-phase electrical system and a value of $$-X\left(\frac{e_x'}{e_x}\right)^2$$

$$I_1' = I_1\sqrt{1.75 - \sqrt{3}/2} = 0.940 I_1$$

$$I_2' = I_1\sqrt{1 + 2\sqrt{3}\tan\theta + 6\tan^2\theta} = I_1\sqrt{1 + 3.46\tan\theta + 6\tan^2\theta}$$

$$I_3' = I_1\sqrt{((1+\sqrt{3}/4 - (3/2 - \sqrt{3}/2)\tan\theta))^2 + ((3/4 + (3/2 + \sqrt{3}/2)\tan\theta))^2}$$

$$= I_1\sqrt{(1/432 - 0.634\tan\theta)^2 + (.750 + 2.37\tan\theta)^2} = I_1\sqrt{2.61 + 1.732\tan\theta + 6.00\tan^2\theta}$$

2. The combination of claim 1 wherein the resistance R is negative, so that this resistance together with the parallel reactance X together represent a power source, X being a finite reactance.

References Cited in the file of this patent

UNITED STATES PATENTS

| | | |
|---|---|---|
| 1,843,521 | Smith | Feb. 2, 1932 |
| 2,359,768 | Kiltie | Oct. 10, 1944 |
| 2,453,263 | Potter | Nov. 9, 1948 |
| 2,467,863 | Short | Apr. 19, 1949 |
| 2,480,576 | Helber | Aug. 30, 1949 |